(12) United States Patent
Dulac

(10) Patent No.: US 7,432,851 B2
(45) Date of Patent: Oct. 7, 2008

(54) METHOD AND DEVICE FOR DETERMINING THE STATE OF TRAVEL OF A VEHICLE

(75) Inventor: Gilles Dulac, Villeneuve Tolosane (FR)

(73) Assignee: Continental Automotive France, Toulouse (FR)

( * ) Notice: Subject to any disclaimer, the term of this patent is extended or adjusted under 35 U.S.C. 154(b) by 155 days.

(21) Appl. No.: 11/293,265

(22) Filed: Dec. 5, 2005

(65) Prior Publication Data

US 2006/0132356 A1    Jun. 22, 2006

(30) Foreign Application Priority Data

Dec. 10, 2004    (FR) .................................. 04 13174

(51) Int. Cl.
*G01F 17/00* (2006.01)
(52) U.S. Cl. ............................ 342/173; 701/29; 701/36
(58) Field of Classification Search .............. 701/29–36, 701/1; 340/445–448
See application file for complete search history.

(56) References Cited

U.S. PATENT DOCUMENTS

| | | | | |
|---|---|---|---|---|
| 5,802,492 A | * | 9/1998 | DeLorme et al. | ......... 455/456.5 |
| 5,931,888 A | * | 8/1999 | Hiyokawa | .................... 701/208 |
| 6,230,556 B1 | | 5/2001 | Malinowski | |
| 2004/0239492 A1 | | 12/2004 | Katou | |

FOREIGN PATENT DOCUMENTS

| | | | |
|---|---|---|---|
| EP | 1 481 823 | | 12/2004 |
| FR | GB 2 344 232 | | 5/2000 |
| GB | 2386427 A | * | 9/2003 |

* cited by examiner

*Primary Examiner*—Khoi H. Tran
*Assistant Examiner*—Marie Weiskopf
(74) *Attorney, Agent, or Firm*—Young & Thompson

(57) ABSTRACT

A method and a device for determining the state of travel, whether stationary or moving along, of a vehicle. The method includes equipping at least one wheel (2) with a magnetic sensor (4) having an axis of maximum sensitivity, measuring a signal at the terminals of the magnetic sensor (4) so as to deliver a signal representative of the variations in the values of the magnetic field as detected by the magnetic sensor, and in providing either information that the vehicle is stationary if there are no variations in the signal delivered, or information that the vehicle is moving along when there is a cyclic variation in the signal.

4 Claims, 2 Drawing Sheets

METHOD AND DEVICE FOR DETERMINING THE STATE OF TRAVEL OF A VEHICLE

BACKGROUND OF THE INVENTION

The invention relates to a method and a device for determining the state of travel, whether stationary or moving along, of a vehicle. It extends to a method and a device for locating the position, on the right or on the left, of a vehicle wheel.

DESCRIPTION OF THE RELATED ART

Motor vehicles are increasingly possessing systems for monitoring and/or measuring parameters comprising sensors mounted on said vehicle.

By way of example regarding such systems, mention may be made of monitoring systems comprising sensors mounted on each of the wheels of vehicles, these sensors being dedicated to measuring parameters, such as the pressures and/or temperatures of the tires with which these wheels are equipped, and intended to inform the driver of any abnormal variation in the parameter measured.

These monitoring systems conventionally comprise:
  mounted on each of the wheels of the vehicle, a unit incorporating a measurement sensor, a microprocessor and a radiofrequency emitter,
  and, mounted on the vehicle, a central unit for receiving the signals emitted by the emitters, this central unit being provided with a computer incorporating a radiofrequency receiver connected to an antenna.

In addition, these monitoring systems usually comprise a displacement sensor designed to be sited with the measurement sensor and intended to provide information regarding the state of travel of the vehicle (whether stationary or moving along).

Such information allows the monitoring systems to be given two modes of operation which differ through the transmission frequency of the signals from the measurement sensors emitted to the central unit and programmed so that this transmission frequency is reduced in the mode of operation corresponding to the vehicle being stationary.

This management of the transmission frequency of the signals from the measurement sensors in actual fact leads, when the vehicle is stationary, to a reduction, on the one hand, in the power consumption of the batteries that power the on-board microprocessors and, on the other hand, in the "contamination" of the vehicle surroundings and, as a result, particularly in the risk of parasitic interference between nearby vehicles.

The displacement sensors conventionally used for the abovementioned purposes consist either of rotation sensors (usually known as roll switches) or of accelerometers consisting of strain gauges of the deformable beam type.

However, such sensors have in common two major disadvantages lying, on the one hand, in terms of their cost, in their high cost price, and, on the other hand, in terms of performance, in the fact that the "boundary" value between the stationary and moving-along states is determined only very approximately which means that a high moving-along threshold of the order of 40 km/h has to be chosen.

SUMMARY OF THE INVENTION

The present invention aims at alleviating these disadvantages and its first objective is to provide a method and a device that allow the state of travel, whether stationary or moving along, of a vehicle to be determined without the need for a conventional displacement sensor, and which are therefore devoid of the disadvantages associated with the presence of said sensors.

Another objective of the invention is to provide a quick and accurate method for detecting changes in the state of travel of a vehicle.

Another objective of the invention is to provide a method for locating, right/left, the position of a wheel of the vehicle that is very effective in terms of responsiveness, and which also, to implement it, requires hardware that is overall inexpensive to source and to fit.

To this end, the invention is aimed firstly at a method for determining the state of travel, whether stationary or moving along, of a vehicle, consisting in equipping at least one of the wheels of said vehicle with a magnetic sensor having an axis of maximum sensitivity, and:
  in measuring a signal at the terminals of the magnetic sensor so as to deliver a signal representative of the variations in the values of the magnetic field as detected by said magnetic sensor,
  and in providing either information that the vehicle is stationary if there are no variations in the signal delivered, or information that the vehicle is moving along when there is a cyclic variation in said signal.

The principle underlying the invention has therefore been to equip at least one of the wheels of the vehicles with a magnetic sensor, to measure the variations in the magnetic field "seen" by said magnetic sensor, and to liken:
  the absence of variations in the magnetic field to an absence of rotation of the wheel, and therefore to the vehicle's being in a stationary state,
  and a cyclic variation in the magnetic field to rotation of the wheel, and therefore to the vehicle's being in a moving-along state.

Specifically, a magnetic sensor mounted on a wheel of a vehicle detects the variations in the overall magnetic field obtaining around this vehicle, made up of the earth's magnetic field to which the environmental magnetic field that may in particular result from the presence of electrical or magnetic equipment on board the vehicle is added.

Now, when the wheel is not rotating, this overall magnetic field "seen" by the magnetic sensor is substantially constant, hence an absence of variation in the signal at the terminals of said magnetic sensor. By contrast, when the wheel rotates, the magnetic sensor moves in a circular path which means that this sensor detects a varying magnetic field and that this signal measured at the terminals of said sensor exhibits corresponding cyclic variations, and does so as soon as the wheel starts to rotate.

According to this principle, the invention leads to very quick and accurate discrimination between the two states of travel of the vehicles, because this discrimination depends chiefly merely on the sensitivity of the means for measuring the amplitude of the variations in the signal at the terminals of the magnetic sensor rather than on the rotational speed of the wheel.

Furthermore, with a view to increasing this sensitivity, and advantageously, the cyclic signal representative of the variations in the values of the magnetic field as detected by the magnetic sensor is amplified and shaped in such a way as to obtain a periodic signal of squarewave shape, as the vehicle moves along.

With the same view to increasing the sensitivity and therefore the reliability of the method according to the invention, the vehicle is advantageously equipped with a magnet that is fixed with respect to each wheel equipped with a magnetic sensor, said magnet being positioned and having a power suitable for generating a magnetic field covering a zone through which said magnetic sensor passes as said wheel rotates.

Furthermore, through simple software modifications, the method according to the invention also makes it possible to provide information about the rotational speed of the wheel and therefore about the speed of travel of the vehicle. To this end and advantageously, when the vehicle is moving, the period of the cyclic signal representative of the variations in the values of the magnetic field which are detected via the magnetic sensor is measured and this data item is used to calculate the rotational speed of the wheel equipped with said magnetic sensor.

It should further be noted that the method according to the invention does not, on the whole, in order to implement it, require anything more than a simple magnetic sensor instead of the current displacement sensors.

This advantage afforded by the invention may also prove to be more decisive when the method is implemented on a vehicle provided with wheels which are equipped with an electronic unit for monitoring and/or measuring a parameter, incorporating a low-frequency antenna consisting of an inductor. Indeed, the information regarding the state of travel of the vehicle can then advantageously be delivered on the basis of measurements of the signal at the terminals of the antenna-forming inductor. This inductor then has a dual function, namely:

an antenna function, and
a magnetic sensor function.

According to another advantageous embodiment, the invention also provides a method for locating the position, on the right or on the left, of a vehicle wheel. To this end, according to the invention:

the wheel is equipped with a second magnetic sensor, said second magnetic sensor and the first magnetic sensor being positioned in such a way that their axes of maximum sensitivity lie in a plane that is secant to the axis of rotation of the wheel and are offset from one another, in this secant plane, by a predetermined angle θ, and, as the vehicle moves in a given direction of travel:

the signal generated by the variation in the magnetic field is measured at the terminals of each of the two magnetic sensors so as to deliver two periodic signals phase-shifted with respect to one another by an angular value equal to (+ or −) θ, each one representative of the variations in the values of the magnetic field as detected by said magnetic sensors during one revolution of the wheel, this phase shift is used to determine the direction of rotation of the wheel, and from this direction of rotation and from the direction of travel of the vehicle, the location of the wheel, whether positioned on the right or on the left, is deduced.

The location method therefore consisted in equipping each wheel to be located of a vehicle with two magnetic sensors arranged in such a way that the signals at the terminals of said sensors are phase-shifted relative to one another, and in deducing from this phase shift the direction of rotation and the location, on the right/on the left, of the wheel.

According to this principle, the invention leads to very quick location of the position, right or left, of a wheel, this location being obtained, in effect, after just a few wheel revolutions. In addition, the overall cost (sourcing and fitting) of two magnetic sensors is relatively low and, in particular, lower than that of an antenna or that of an accelerometer.

In addition, with a view to obtaining two signals that can be readily discriminated, and according to an advantageous embodiment of the invention, the two magnetic sensors are positioned in such a way that their axes of maximum sensitivity lie orthogonal to one another, in a plane orthogonal to the axis of rotation of the wheel.

Furthermore, when the wheel is equipped with two magnetic sensors, and advantageously according to the invention, the state of travel of the vehicle is determined by alternately measuring, during predetermined periods of time, the signal at the terminals either of the first magnetic sensor or of the second magnetic sensor.

Such alternation has a failsafe objective because the function of determining the movement of a vehicle is afforded, according to the invention, even if one of the two magnetic sensors fails.

The invention extends to cover a device for determining the state of travel, whether stationary or moving along, of a vehicle, comprising mounted on at least one of the wheels of said vehicle:

a magnetic sensor having an axis of maximum sensitivity,
means for measuring a signal at the terminals of the magnetic sensor, these means being able to deliver a signal representative of the variations in the values of the magnetic field as detected by said magnetic sensor,
and a calculation unit programmed to provide information that the vehicle is stationary if there are no variations in the signal delivered by the measurement means, and information that the vehicle is moving along when there is a cyclic variation in said signal.

In addition, advantageously, the calculation unit is programmed, as the vehicle moves along, to measure the period of the cyclic signal delivered by the measurement means and to calculate, from this data item, the rotational speed of the wheel equipped with the magnetic sensor.

Furthermore, the measurement means advantageously comprise means for amplifying and means for shaping the amplified signal which are able to convert it into a periodic signal of squarewave form as the vehicle moves along.

This device also advantageously comprises a magnet mounted fixedly on the vehicle with respect to each wheel equipped with a magnetic sensor, said magnet being positioned and having a power suitable for generating a magnetic field covering a zone through which said magnetic sensor passes as said wheel rotates.

Such a device is also particularly intended for vehicles provided with wheels which are equipped with an electronic unit for monitoring and/or measuring a parameter, incorporating a low-frequency antenna consisting of an inductor. In this case and advantageously, the measurement means are arranged in such a way as to measure a signal at the terminals of said inductor that also forms an antenna.

The device according to the invention may also and advantageously make it possible to locate the position, on the right or on the left, of a wheel of the vehicle. To this end and firstly, it comprises, mounted on the wheel, a second magnetic sensor, said second magnetic sensor and the first magnetic sensor being positioned in such a way that their axes of maximum sensitivity lie in a plane that is secant to the axis of rotation of the wheel and are offset from one another, in this secant plane, by a predetermined angle θ. Furthermore, and advantageously according to the invention, the measurement means are then arranged at the terminals of each of the two magnetic sensors so as to deliver, as the vehicle moves along, two periodic signals phase-shifted with respect to one another by an angular value equal to (+ or −) θ, each one representative of variations in the values of the magnetic field as detected by said magnetic sensors during one revolution of the wheel, and the calculation unit is then programmed to determine, from the phase shift between the two periodic signals, the direction of rotation of the wheel and, from this direction of rotation and from the direction of travel of the vehicle, to deduce the position, (positioned on the right or on the left), of the wheel.

In addition, with a view to obtaining two signals that can be discriminated readily, the two magnetic sensors are advantageously positioned in such a way that their axes of maximum sensitivity lie orthogonal to one another, in a plane orthogonal to the axis of rotation of the wheel.

BRIEF DESCRIPTION OF THE DRAWINGS

Other characteristics, objects and advantages of the invention will become apparent from the detailed description which follows with reference to the attached drawings which by way of nonlimiting examples illustrate two preferred embodiments thereof. In these drawings.

DESCRIPTION OF THE PREFERRED EMBODIMENTS

Figure 1:
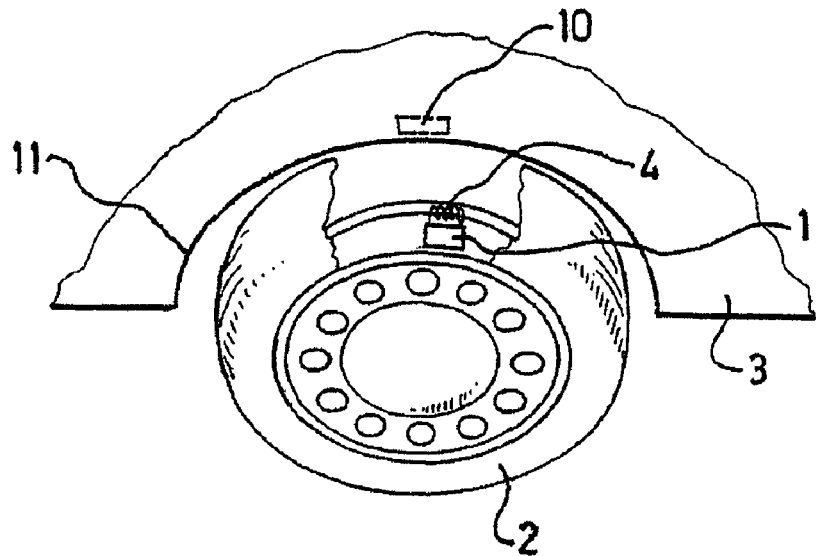
FIG. 1 is a partial and schematic perspective view of a vehicle equipped with a device according to the invention for determining the state of travel of a vehicle.

The device according to the invention depicted by way of example in FIG. 1 is designed to detect the rotation of a wheel of a vehicle with a view to determining the state of travel, whether stationary or moving along, of said vehicle.

This device more specifically finds its application in the context of monitoring systems comprising electronic units 1 mounted on each of the wheels 2 of vehicles 3, incorporating sensors dedicated to measuring parameters, such as the pressures and/or temperatures of the tires with which these wheels 2 are equipped, and which are intended to inform the driver of any abnormal variation in the parameter measured.

In the context of this application, the device according to the invention is designed to use an antenna 4, consisting of an inductor, with which each electronic unit 1 is conventionally equipped with a view to low-frequency LF transmissions, of the order of 125 kHz. The device according to the invention has the function of measuring the potential difference at the terminals of this inductor 4 and, from the results of these measurements, of deducing the state of travel of the vehicle 3 by likening:

an absence of variations in the potential difference measured to an absence of rotation of the wheel 2, and therefore to the fact that the vehicle 3 is in a stationary state, and a cyclic variation in the potential difference measured to a rotation of the wheel 2, and therefore to the fact that the vehicle 3 is in a moving-along state.

A magnetic sensor 4 mounted on a wheel 2 of the vehicle 3 in effect detects the variations in the overall magnetic field obtaining around this sensor, which overall magnetic field is made up of the earth's magnetic field to which the environmental magnetic field that may in particular result from the presence of electrical or magnetic equipment on board the vehicle is added, and:

when the wheel 2 is not rotating, this overall magnetic field "seen" by the magnetic sensor 4 is substantially constant, hence an absence in variation in the potential difference at the terminals of said magnetic sensor, whereas, when the wheel 2 is rotating, the magnetic sensor 4 moves in a circular path which means that this sensor 4 detects a varying magnetic field and that the potential difference measured at the terminals of said sensor exhibits corresponding cyclic variations.

It should be noted that, according to the invention, the LF antenna 4 generally constitutes the most economical magnetic sensor because this antenna 4 is usually incorporated into the electronic units 1 that make up the systems for monitoring and/or measuring parameters.

However, it may be envisaged for use to be made of any other type of magnetic sensor such as, for example, a Hall-effect sensor, a ferrite coil, a flat coil, etc.

Figure 3:
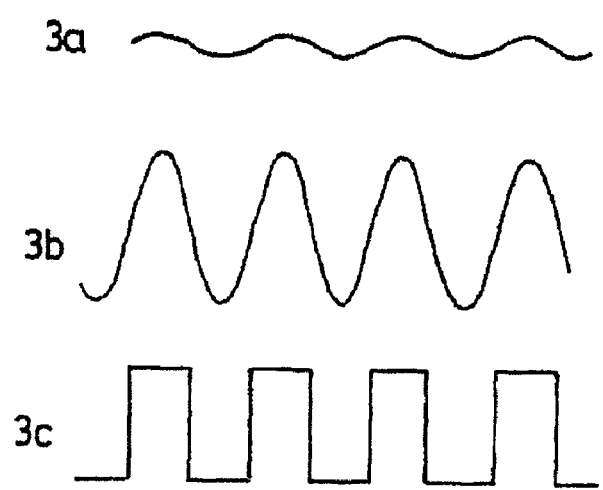

With a view to measuring and processing the potential difference at the terminals of the antenna 4, the device according to the invention firstly comprises an amplification module 6 and a shaping module 7 incorporating a comparator, such that, as depicted in FIG. 3, as the wheel 2 rotates:

the signal 3a at the terminals of the magnetic sensor 4 is a very low amplitude sinusoidal signal, the signal 3b leaving the amplification module 6 is a sinusoidal signal with the same period as the previous signal but with an amplitude greater than that of said signal 3a, and the signal 3c leaving the shaping module 7 is a square-wave signal with the same period as the sinusoidal signals 3a and 3b.

The device according to the invention further comprises a calculation unit 8 to which the shaped signal 3c is delivered and which is programmed to:

provide, as mentioned above, information either that the vehicle is stationary or that the vehicle is moving along, depending on whether or not the signal received is periodic in nature, also provide, when the vehicle is moving along, information representative of the rotational speed of the wheel 2 bearing the magnetic sensor 4, this being a direct function of the period of the squarewave signal 3c received.

Lastly, and according to the invention, the vehicle 3 may also comprise, as depicted in FIG. 1, permanent magnets or electromagnetic magnets 10 fixed to the carbody at the wheel arches 11, so that the magnetic field created by each of these magnets 10 is detected by the magnetic sensor 4 mounted on the corresponding wheel 2, increasing the overall magnetic field detected by said sensor and therefore the amplitude of the sinusoidal signal leaving the amplification module 6.

Through simple software modifications to the calculation units 8 with which the electronic units 1 of systems for monitoring and/or measuring operating parameters of motor vehicles 3 are conventionally equipped, the device according to the invention therefore makes it possible not only quickly and accurately to determine the state of travel of these vehicles 3 but also, when the vehicles are moving along, to provide reliable information regarding the speed of travel of said vehicles.

Figure 4:
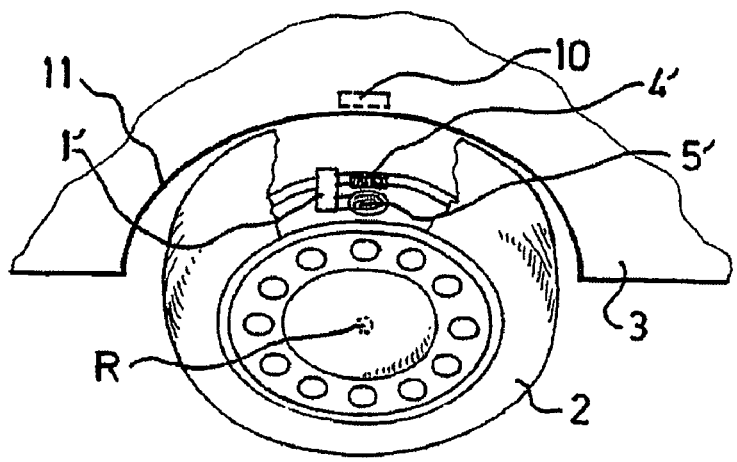
FIG. 4 is a partial and schematic perspective view of a vehicle equipped with a variant embodiment of a device according to the invention that also allows a vehicle wheel to be located.

FIG. 4 depicts an embodiment variant of a device according to the invention that makes it possible, aside from determining the state of travel of a vehicle, to locate (positioned on the right or on the left) the wheels of this vehicle.

This device firstly comprises two magnetic sensors 4', 5' designed to be able to be incorporated into the same electronic unit 1' and arranged in such a way that their axes of maximum sensitivity S4, S5 lie in the same plane perpendicular to the axis of rotation R of the wheel 2 and are offset from one another by a predetermined angle θ preferably equal to 90°.

Figure 4A:
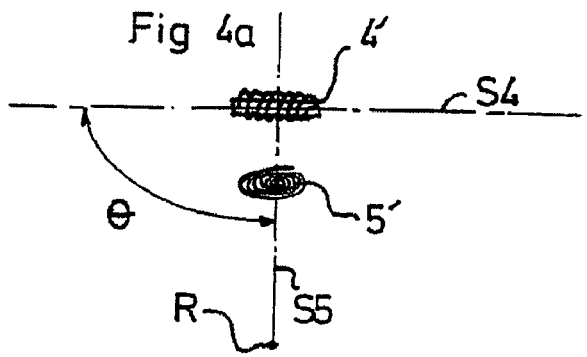
FIG. 4a is a detailed diagram depicting the relative arrangement of the two magnetic sensors of the device according to the invention depicted in FIG. 4, and FIGS. 5a and 5b are two diagrams illustrating the principle of the location method employed by means of the device according to the invention depicted in FIG. 4.

To this end, and according to the exemplary embodiment depicted in FIGS. 4 and 4a, these two magnetic sensors 4', 5', on the one hand, are aligned along the same radial axis with respect to the axis of rotation R of the wheel 2 and, on the other hand, consist of:

- a coil 4' comprising a soft iron core, positioned such that the longitudinal axis of said core, that forms the axis of maximum sensitivity S4 of said coil, coincides with an axis tangential to a circle centered on the axis of rotation R of the wheel 2,
- and a flat coil 5' formed of a flat winding positioned in such a way that the longitudinal axis of said winding that forms the axis of maximum sensitivity S5 of said coil coincides with the aforementioned radial axis.

Positioned in this way, as the wheel 2 rotates, each of these coils 4', 5' exhibits, between its two terminals, a potential difference that varies according to a sinusoidal function with a period equal to the period of rotation of said wheel.

Figure 5A:
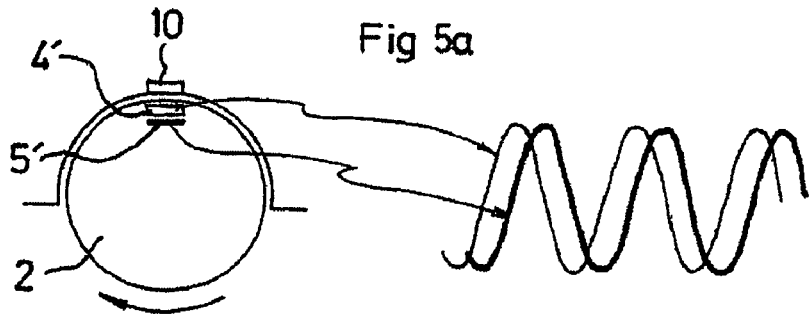
Figure 5B:
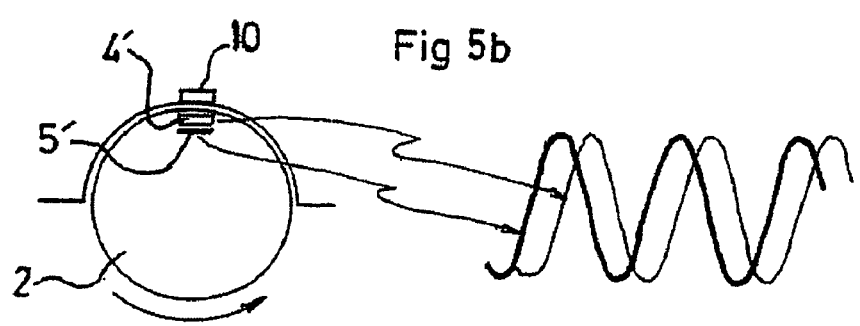

Furthermore, since according to the invention the two coils 4', 5' are positioned such that their axes of maximum sensitivity S4, S5 are orthogonal, the signals representative of the potential difference at the terminals of said coils are phase shifted from one another by an angle equal to (+ or −) 90°, so that, as depicted in FIGS. 5a and 5b, analysis of this phase shift makes it possible to determine the direction of rotation of the wheel 2.

Figure 2:
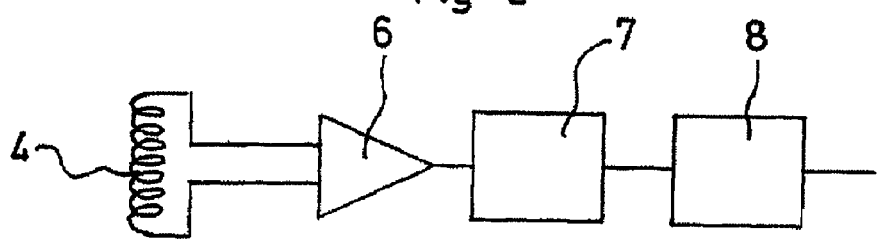
FIG. 2 is a functional block diagram of the processing electronics of this device, FIGS. 3a to 3c consist of three graphs representing the change in the measured signal as it is processed by the electronics of the device according to the invention.

As in the embodiment of FIG. 1, with a view to measuring and processing the potential difference at the terminals of each coil 4', 5', the device according to the invention firstly comprises an amplification module 6 and a shaping module 7 which are identical to those described hereinabove with reference to FIG. 2.

This device further comprises a calculation unit to which the shaped signals are delivered, and programmed to:

- determine, as mentioned hereinabove, from analyzing the phase shift between the two sinusoidal signals, the direction of rotation of the wheel 2,
- and from this direction of rotation and the direction of travel of the vehicle 3, determined elsewhere by any method known per se, deduce the position, on the right or on the left, of the wheel 2.

Lastly, and according to this variant embodiment, the vehicle 3 may also comprise, as depicted in FIG. 4, permanent magnets or electromagnetic magnets 10 fixed to the carbody at the wheel arches 11.

This variant embodiment according to the invention therefore makes it possible, by incorporating two low-cost simple magnetic sensors 4', 5' into each electronic unit 1' fitted to a wheel 2 of the vehicle 3 to locate, very quickly, after a few revolutions of the wheel 2, whether said wheel is positioned on the right or on the left.

The invention claimed is:

1. A method for determining the state of travel, whether stationary or moving along, of a vehicle (3), comprising:
   equipping at least one of the wheels (2) of said vehicle with a magnetic sensor (4; 4') having an axis of maximum sensitivity (S4);
   measuring a signal at the terminals of the magnetic sensor (4; 4') so as to deliver a signal representative of the variations in the values of the earth magnetic field as detected by said magnetic sensor; and
   based on the measured variations, providing either information that the vehicle is stationary if there are no variations in the signal delivered, or information that the vehicle is moving along when there is a cyclic variation in said signal, characterized in that:
   the wheel (2) is equipped with a second magnetic sensor (5'), said second magnetic sensor and the first magnetic sensor (4') being positioned in such a way that their axes of maximum sensitivity (S4, S5) lie in a plane that is intersecting the axis of rotation (R) of the wheel (2) and said axes are offset from one another, in said plane, by a predetermined angle θ,
   and, as the vehicle moves in a given direction of travel:
      the signal generated by the variation in the magnetic field is measured at the terminals of each of the two magnetic sensors (4', 5') so as to deliver two periodic signals phase-shifted with respect to one another by an angular value equal to (+ or −) θ, each one representative of the variations in the values of the magnetic field as detected by said magnetic sensors during one revolution of the wheel (2),
      this phase shift is used to determine the direction of rotation of the wheel (2),
      and from this direction of rotation and from the direction of travel of the vehicle (3), the location of the wheel (2), whether positioned on the right or on the left, is deduced.

2. The method as claimed in claim 1, characterized in that the two magnetic sensors (4', 5') are positioned in such a way that their axes of maximum sensitivity (S4, S5) lie orthogonal to one another, and said plane is orthogonal to the axis of rotation (R) of the wheel (2).

3. The method as claimed in claim 1, characterized in that the state of travel of the vehicle (3) is determined by alternately measuring, during predetermined periods of time, the signal at the terminals either of the first magnetic sensor (4') or of the second magnetic sensor (5').

4. The method of claim 1, wherein said plane is orthogonal to the axis of rotation (R) of the wheel (2).

* * * * *